F. T. NOLAN.
SHAFT PACKING.
APPLICATION FILED JUNE 18, 1917.

1,265,488.

Patented May 7, 1918.

WITNESSES
Frederick Diehl.
E. B. Marshall

INVENTOR
F. T. Nolan
BY
ATTORNEYS

UNITED STATES PATENT OFFICE.

FREDERICK THOMAS NOLAN, OF JACKSONVILLE, FLORIDA.

SHAFT-PACKING.

1,265,488. Specification of Letters Patent. Patented May 7, 1918.

Application filed June 18, 1917. Serial No. 175,352.

*To all whom it may concern:*

Be it known that I, FREDERICK T. NOLAN, a citizen of the United States, and a resident of Jacksonville, in the county of Duval and State of Florida, have invented a new and Improved Shaft-Packing, of which the following is a full, clear, and exact description.

My invention has for its object to provide an all-metal packing for shafting which removes all wear from the shaft, it being unnecessary to employ a brass sleeve on the shaft.

In making use of the invention two collars are employed, one of which is secured to the shaft for rotating therewith, the other collar being secured against movement with the shaft, the last mentioned collar being held yieldingly extended in the direction of the collar fixed to the shaft, and when desired a compensating ring is employed which separates the two collars.

Additional objects of the invention are disclosed in the following specification in which the preferred form of the invention is described.

In the drawings similar reference characters denote similar parts in both views, in which—

Figure 1:
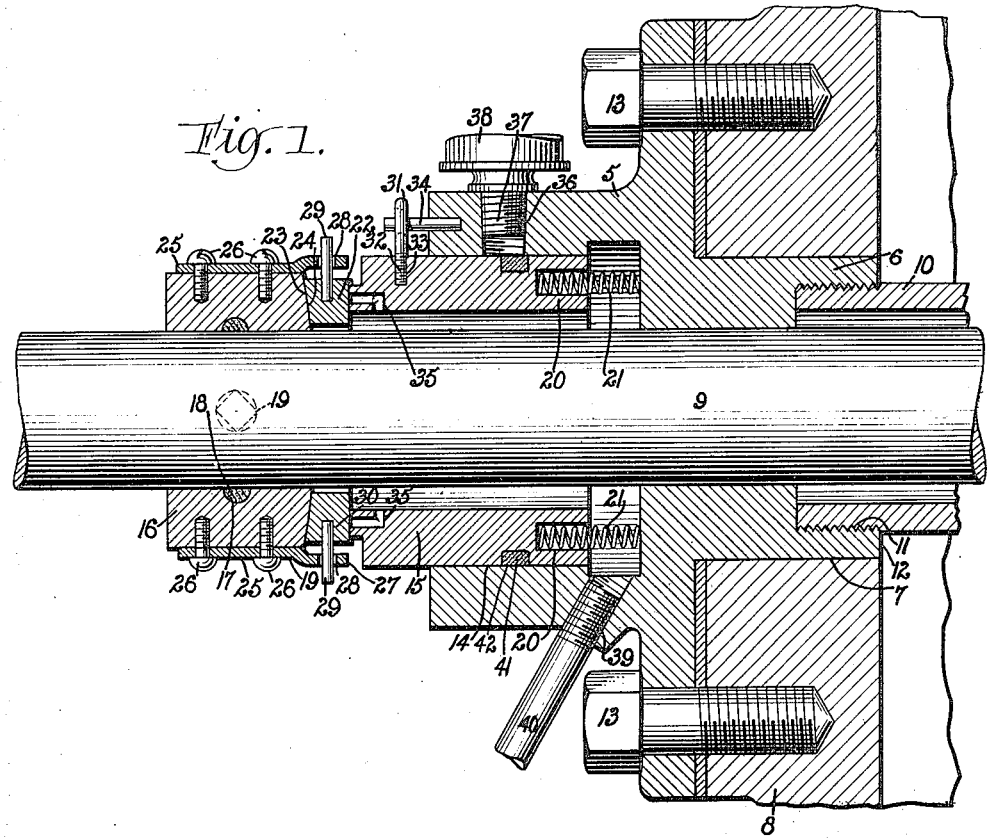
Figure 1 is a longitudinal sectional view illustrating the invention.
Figure 2:
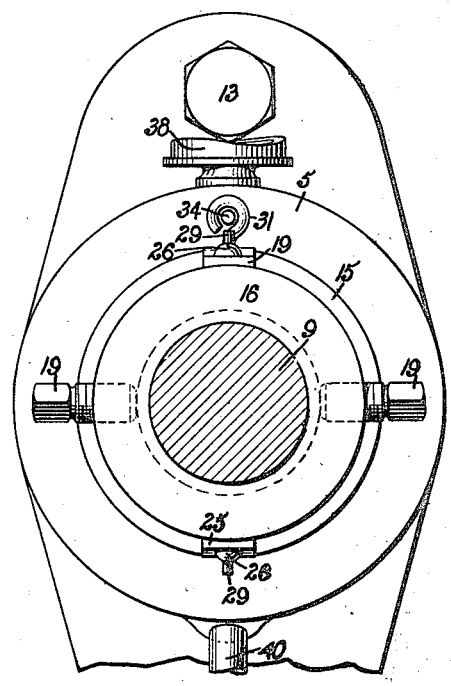
Fig. 2 is an end view of Fig. 1.

By referring to the drawings it will be seen that a stuffing box 5 is employed having a projection 6 disposed in an opening 7 in a machine member 8. A shaft 9 is journaled in the stuffing box 5; and disposed around the shaft 9 there is a sleeve 10 which has an outer thread 11 which meshes with an inner thread 12 in the stuffing box 5, the said inner thread 12 being spaced from the shaft 9 to space the sleeve 10 from the said shaft. The stuffing box 5 is secured to the machine member 8 by bolts 13, all in a manner readily understood.

The stuffing box 5 has a circular opening 14 in which a collar 15 is disposed, a second collar 16 being disposed beyond the collar 15, the collar 16 fitting around the shaft 9 and having a groove 17 semi-circular in cross-section in which a soft metal 18 is disposed. A set screw 19 is provided which secures the collar 16 and the soft metal 18 to the shaft 9.

It will be seen that while the collar 16 fits snugly around the shaft 9, the collar 15 is spaced from the said shaft, and that the collar 15 is provided with recesses 20 adjacent the stuffing box 5 in which springs 21 are disposed, the said springs 21 abutting against the stuffing box 5 and serving to move the collar 15 in the direction of the collar 16. The drawings illustrate a compensating ring 22 which is disposed between the collars 15 and 16; but when desired it will be understood that this compensating ring may be dispensed with, and the collar 15 may be pressed by the springs 21 against the collar 16. When the compensating ring 22 is employed, the adjacent surface 23 of the collar 16 is curved radially, and the surface 24 of the compensating ring 22 which contacts with the collar 16 is also curved radially to fit the curved surface 23. This serves to support the compensating ring 22 radially and spaced from the shaft 9, the springs 21 forcing the collar 15 against the compensating ring 22 to make a tight joint. The compensating ring 22 rotates with the collar 16, this being provided for by plates 25 which are secured to the collar 16 by screws 26 which have flanges 27 at the outer side of the compensating ring 22, these flanges 27 being provided with orifices 28 in which pins 29 are disposed, the said pins 29 being inserted in orifices 30 in the compensating ring 22. The collar 15 is provided with an eye 31 mounted on a screw 32 which meshes in a threaded orifice 33 in the collar 15, a pin 34 on the stuffing box 5 being disposed in the eye 31 and thereby serving to prevent the rotation of the collar 15 while permitting the movement of the collar 15 under the influence of the springs 31 longitudinally of the shaft 9.

When the pressure of the collar 15 outwardly in the direction of the collar 16 is excessive under the influence of the springs 21 and pressure at the side of the collar 15, openings 35 are made in the collar 15 which extend from the inner surface of the collar through the collar's outer end. The stuffing box is designed for use on marine propeller shafts and water under pressure from the ocean will act on the collar 15 adjacent the springs 21. The openings 35 will permit this water under ocean pressure to relieve excessive pressure between the collar 15 and the compensating ring 22. The stuffing box 5 is preferably provided with a threaded orifice 36 for receiving the thread 37 on a grease cup 38. The stuffing box 5 is also provided with a threaded orifice 39 at its bottom in which a pipe 40 is disposed, the said pipe 40 leading to a drain cock.

If desired a piston ring 41 may be disposed in a groove 42 made for that purpose in the collar 15.

Having thus described my invention, I claim as new and desire to secure by Letters Patent:

1. In a shaft packing, a shaft, a collar having means by which it may be secured for rotating with the shaft, a second collar disposed around the shaft and spaced therefrom to form a passage between the second collar and the shaft to reduce friction, the second collar having an end disposed adjacent an end of the first collar, resilient means for pressing the second collar in the direction of the first collar, a member extending radially at the outer side of the second collar and provided with an eye at its outer end, and a pin extending longitudinally of the axis of the collars and disposed in the eye member to prevent the second collar from rotating with the first collar while permitting the movement of the second collar longitudinally of the axis of the collars.

2. In a shaft packing, a collar having means by which it may be secured for rotating with a shaft, a second collar having one end disposed adjacent an end of the first collar, there being orifices in the other end of the second collar, springs in the orifices for pressing the second collar in the direction of the first collar, means which will prevent the second collar from rotating with the first collar while permitting the movement of the second collar longitudinally of the axis of the collars, a compensating ring between the two collars, and means which will rotate the compensating ring with the first collar while permitting a radial movement of the compensating ring relatively to the first collar.

3. In a shaft packing, a collar having means by which it may be secured for rotating with a shaft, one end of the collar being curved radially, a second collar having an end disposed adjacent the said end of the first collar, resilient means at the other end of the second collar for pressing the second collar in the direction of the first collar, means which will prevent the second collar from rotating with the first collar while permitting a movement of the second collar longitudinally of the axis of the collars, a compensating ring disposed between the two collars, the end of the compensating ring next to the first collar being curved radially to fit the curved end of the first collar, and means which will rotate the compensating ring with the first collar while permitting the radial movement of the compensating ring relatively to the first collar.

4. In a shaft packing, a collar having means by which it may be secured for rotating with a shaft, a second collar having one end disposed adjacent an end of the first collar, the inner diameter of the second collar being greater than the inner diameter of the first collar and there being orifices in the other end of the second collar, springs in the orifices for pressing the second collar in the direction of the first collar, and means which will prevent the second collar from rotating with the first collar while permitting the movement of the second collar longitudinally of the axis of the collars, there being an opening from the interior of the second collar through the first mentioned end of the second collar.

5. In a shaft packing, a stuffing box having a bearing and an opening beyond the bearing, a shaft journaled in the bearing, a collar in the opening spaced from the bearing, the inner diameter of the collar being greater than the diameter of the shaft to prevent friction, a second collar beyond the first collar and secured for rotating with the shaft, means which will prevent the first collar from rotating with the second collar while permitting the movement of the first collar longitudinally of the axis of the collars, there being an opening from the interior of the first collar through the end thereof adjacent the second collar.

6. In combination with a stuffing box with a shaft journaled therein, a collar at the stuffing box and disposed around the shaft, a second collar at the outer end of the first collar and secured to the shaft, resilient means for holding the first collar yieldingly in the direction of the second collar, a pin secured to the stuffing box and disposed substantially parallel with the shaft, and an eye secured to the first collar in which the pin is disposed, there being an opening from the interior of the first collar through the first mentioned collar's outer end.

7. In combination with a stuffing box with a shaft journaled therein, a collar at the stuffing box and disposed around the shaft, a second collar at the outer end of the first collar and secured to the shaft, resilient means for holding the first collar yieldingly in the direction of the second collar, a pin secured to the stuffing box and disposed substantially parallel with the shaft, an eye secured to the first collar in which the pin is disposed, a compensating ring between the two collars, and means which will rotate the compensating ring with the second collar while permitting a radial movement of the compensating ring relatively to the second collar.

8. In combination with a stuffing box with a shaft journaled therein, a collar at the stuffing box and disposed around the shaft, a second collar at the outer end of the first collar and secured to the shaft, the second collar at its end nearest the first collar being curved radially, resilient means for holding the first collar yieldingly in the direction of the second collar, a pin secured to the stuffing box and disposed substantially parallel with the shaft, an eye secured to the first collar in which the pin is disposed, a compensating ring disposed between the two collars with the end of the compensating ring adjacent the second collar curved radially to fit the curved end of the second collar, and means to rotate the compensating ring with the second collar while permitting a radial movement of the compensating ring.

FREDERICK THOMAS NOLAN.